Nov. 24, 1953 W. M. HARKS 2,660,337
HOSE EXTENDING AND LATCHING MECHANISM
Filed Oct. 24, 1947 2 Sheets-Sheet 1

WALTER M. HARKS
INVENTOR.
BY Edmund W. C. Kamm
ATTORNEY

Nov. 24, 1953    W. M. HARKS    2,660,337
HOSE EXTENDING AND LATCHING MECHANISM
Filed Oct. 24, 1947    2 Sheets-Sheet 2
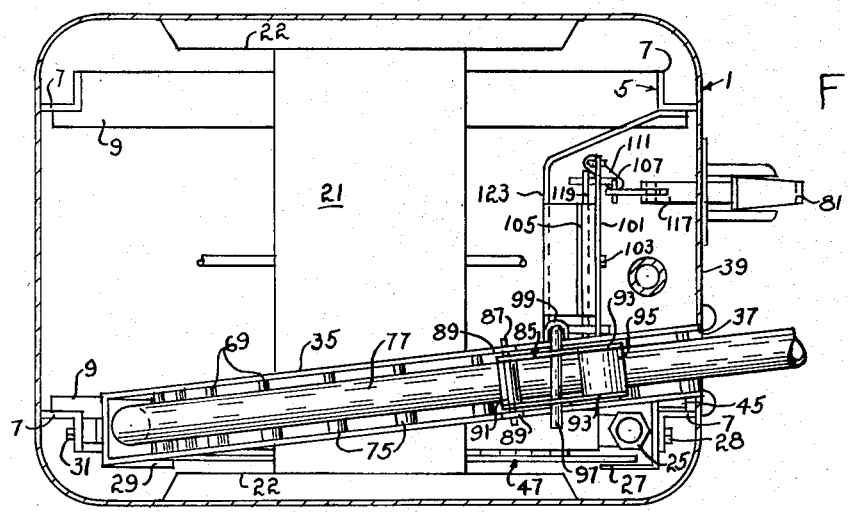
Fig. 2
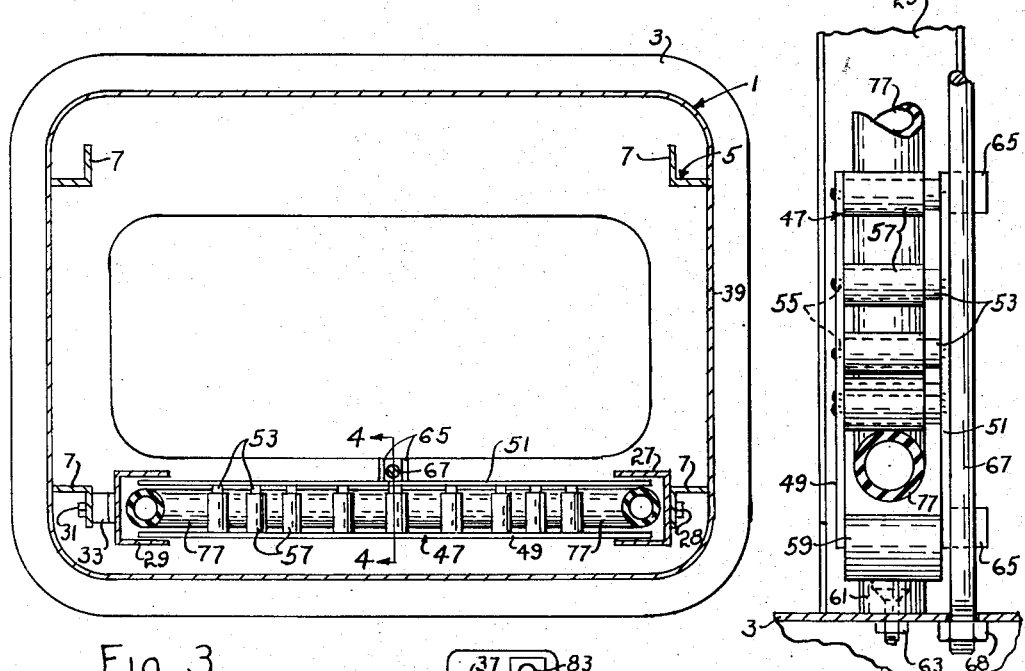
Fig. 3
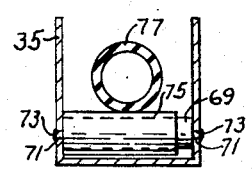
Fig. 5
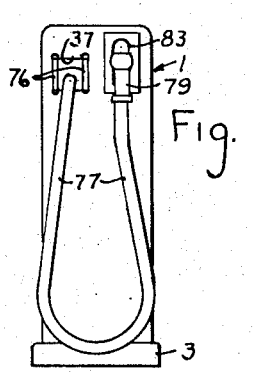
Fig. 7
Fig. 4
WALTER M. HARKS
INVENTOR.
BY Edmund W. E. Kamm
ATTORNEY Patented Nov. 24, 1953

2,660,337

UNITED STATES PATENT OFFICE 2,660,337

HOSE EXTENDING AND LATCHING MECHANISM

Walter M. Harks, Fort Wayne, Ind., assignor to Bowser, Inc., Fort Wayne, Ind., a corporation of Indiana Application October 24, 1947, Serial No. 781,911

8 Claims. (Cl. 222—74)

This invention relates to an extendible hose mechanism and a hose latching means; more specifically, it relates to a mechanism for extending the discharge hose on a filling station dispensing pump and latching the hose in its extended position and for releasing said latch upon return of the nozzle to the nozzle support.

The advent of the low model gasoline dispensing pump has posed quite a problem for the manufacturers due to the fact that the length of hose required by the trade would drag on the ground if suspended on the pump in the usual manner.

It is an object of this invention to provide a hose extending means wherein a part of the hose is concealed in the housing of the pump.

It is another object of this invention to provide a hose extending means wherein the hose is retrieved by a sliding weight.

Another object of this invention is to provide a hose extending means that will retain the hose in any extended position.

It is still another object of this invention to provide a hose extending means for a gasoline dispensing pump that will retain the hose in extended position only when the pump is in operation.

Still another object of this invention is to provide a hose extending mechanism with a gravity operated hose latch to hold the hose in any extended position.

A further object of this invention is to provide a hose extending mechanism and hose latching means which is interconnected with the motor switch and the interlock mechanism on a gasoline dispensing pump for setting and release thereby.

It is still another object of this invention to provide a hose extending mechanism which will not place undue strain on or create excessive wear on the hose.

Yet another object of the invention is to provide a latching means, such as that described, which is moved to released position upon stopping of the pump motor by the operation of the hose hook.

These and other objects will become apparent from a study of the drawings which are attached hereto and made a part hereof, and in which:

Figure 2 is a section taken substantially on the line 2—2 of Figure 1 showing the hose extending mechanism and the hose latch.

Figure 3 is a section taken on the line 3—3 of Figure 1 showing the hose retrieving weight.

Figure 4 is a section of the hose retrieving weight taken on the line 4—4 of Figure 3.

Figure 5 is a section of the curved channel hose support taken on the line 5—5 of Figure 1 showing the hose supporting rollers.

Figure 7 is a schematic drawing showing the position of the hose when the pump is inoperative and the hose is in retracted position.

Figures 1, 6:
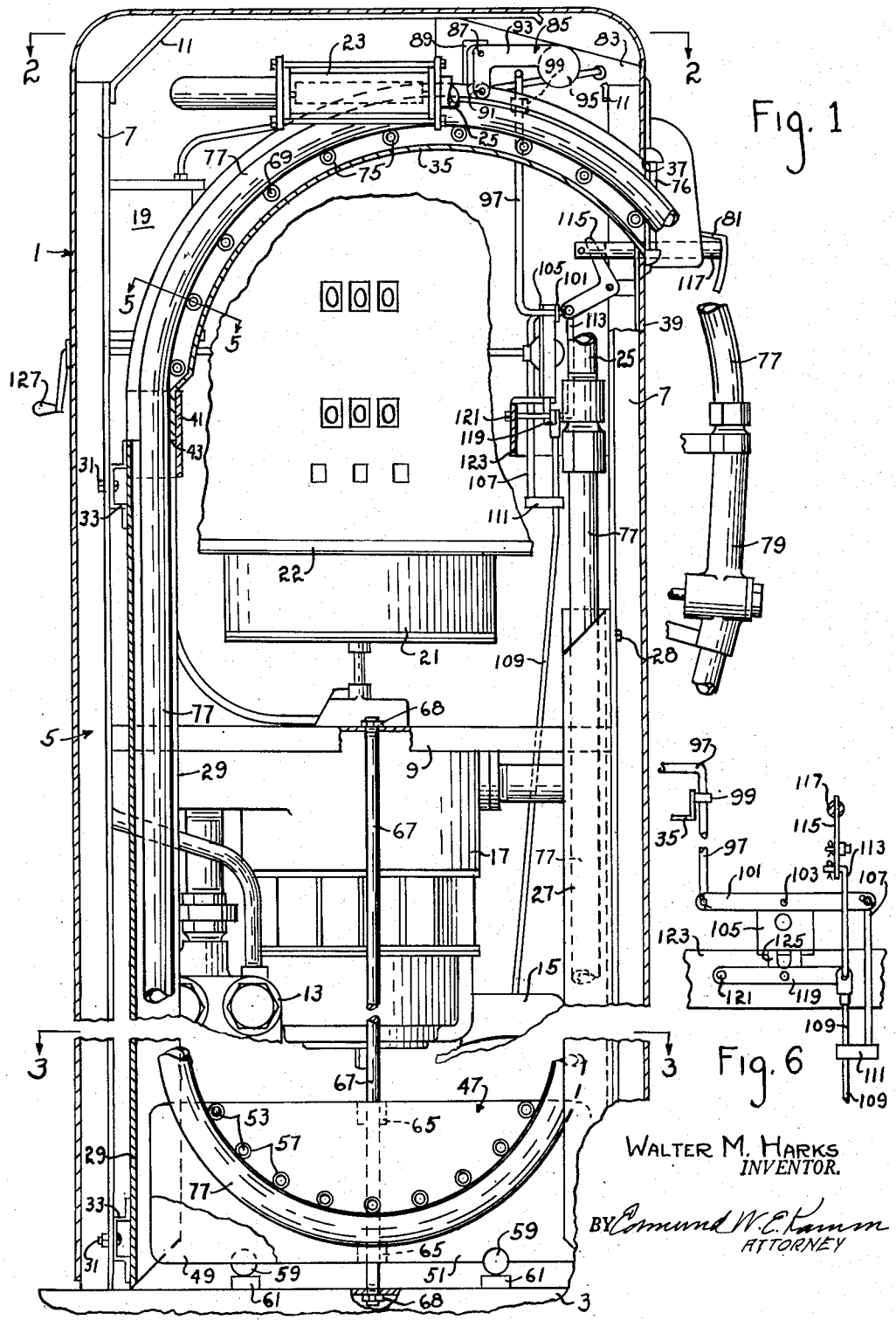
Figure 1 is a view of a gasoline dispensing pump from the dial side showing the hose extending mechanism and the hose latch.
Figure 6 is a view taken from the right of Figure 1 showing the linkage between the hose hook, the hose latch, the interlock and the motor switch rod.

Referring to the drawings, the numeral 1 designates a dispensing pump having a base 3 and a frame 5 comprised of four corner angles 7 and cross members 9 and 11.

Mounted on the frame and having conventional liquid and mechanical connections is a pump 13, a motor 15, a meter 17, an air separator 19, a register 21 having dials 22, and sight glasses 23, one having a discharge pipe 25.

A channel 27 extends upward from the base and has its web fastened to a frame angle 7 by screws and nuts 28. The channel extends a short distance above the cross member 9, is open on the top side and is aligned with the depending portion of the discharge pipe 25.

A similar channel 29 extends upward from the base and has its web fastened to the frame angle 7 opposite the channel 27 on the same dial side of the pump by screws and nuts 31 and clips 33. The channels 27 and 29 are thus opened toward each other and have their flanges and grooves in alignment to form parallel guide walls. The channel 29 extends up higher than channel 27. The channel 29 has joined to it at its upper end an open-topped channel 35 which curves over the top of the computer or register and is bent inwardly out of the plane of the channels so that it will pass back of the frame angle 7, associated with the channel 27, and line up with a rectangular opening 37 in the housing 39 on the hose hook side of the pump. A short channel section 41 is welded in position around the adjoining ends of channels 29 and 35, as viewed in Figure 1, to form a joint 43 between the channels. The outer end of the channel 35 is fastened to the angle 7 by a clip 45 and a screw (not shown).

A hose retrieving head or weight 47 comprises two rectangular side members 49 and 51 held in parallel relationship by spacers 53 having reduced ends 55 which pass through holes in the side members and are riveted over on the outside. Rollers 57, shorter in length than the distance between the side members, are placed over the spacers and are free to rotate and to travel slightly endwise on the spacers. The centers of the rollers are disposed in a smooth curve, as shown in Figure 1, so as to produce a regular, smooth curve in the dispensing hose upon which the rolls ride. Bumpers 59 are welded between the side members and extend beyond their bottom edges in alignment with resilient bumpers 61 mounted on the base by screws and nuts 63. A pair of clips 65 are mounted at the top and bottom of the member 51 and project inward to straddle a guide rod 67 which extends through the base and the cross member 9. The rod is threaded at both ends and is engaged on the under side of the base and on the top side of the cross member by nuts 68. The ends of the head enter the guide ways of channels 27 and 29.

The channel 35 is equipped with spacers 69 having reduced ends 71 extending through holes 73 in the side walls of the channel and which are riveted on the outside of the channel. Rollers 75, shorter than the distance between the walls of the channel, are mounted to rotate and travel slightly endwise on the spacers in a manner similar to the spacers 53 and the rollers 57 of the weight 41. The spacers 69 and the rollers 75 are arranged in a smooth curve with the roller on the far end of the channel adjacent and in line with the bottom of the opening 37 in the housing. Additional guide rollers 76 are mounted in a vertical position on the exterior of the housing on either side of the opening 37.

The discharge hose 77 is screwed into the end of the discharge pipe 25, passes downward into the channel 27, under the rollers 57 and between the side members 49 and 51 of the weight, up inside the channel 29, and over the rollers 75 within and following the curved channel 35 to project, finally, through the opening 37. The hose is then looped downward and up with the nozzle 79 placed on the hose hook 81 with the tip of the nozzle inside the boot 83 as shown in Figure 7.

The latching mechanism, generally indicated by the numeral 85, comprises a bell crank 93 pivoted on the rod 87 which is journalled in a pair of brackets 89 rising from the walls of the channel 35 at a point to the right of the vertical center-line of the pump, as viewed in Figure 1. The latching mechanism comprises a roller 91 mounted for free rotation between side plates of one arm of the bell crank at a point below the pivot rod 87. The other arm of the bell crank extends out from the pivot rod at right angles to the roller mounting arm and terminates in a weight 95, which is welded between the side plates. The weight urges the latching mechanism in a clockwise direction, as viewed in Figure 1, causing the roller 91 and the roller arm to enter the channel 35, and brings the roller 91 to bear in clamping relation upon the top side of the hose 77. The roller 75, directly to the left and below the roller 91, supports and prevents undue deflection of the hose and the action of the weight in tending to return the hose tightens the grip of roll 91 on the hose.

A lifting rod 97 extends under the weighted portion of the bell crank and extends downward through a guide 99 on the side of the channel 35 to connect with a link 101 which has a fulcrum 103 substantially at its center. The fulcrum is fixed on the interlock case 105. The other end of the link receives a rod 107 which extends downward and is coupled to the motor switch rod 109 as shown at 111 (Figs. 1 and 6). The motor switch rod 109 is connected with the hose support 81 by the rod 113, the bell crank 115 and the reciprocating rod 117 which is a part of the hose support. The rod 113 also couples rod 109 to the interlock actuating lever 119 which has a pivot at 121 on the cross member 123 which fastens to the angles 7 on the hose support side of the pump. The interlock seeker 125 is fastened to the interlock actuating lever at the midpoint and has two legs extending upward into the interlock case 105. This seeker and the interlock mechanism are fully disclosed in the Patent Number 2,299,894 issued October 27, 1942, to C. P. Griffith for "Control Mechanism for Liquid Dispensing Apparatus" and no detailed explanation of its construction and operation is believed to be necessary.

The register reset crank 127 is located on the pump housing on the side opposite the hose support and connected to reset the register and to recondition the interlock mechanism in a manner commonly known in the art.

*Operation*

The pump operation is initiated by resetting the register 21 to zero, which is accomplished by rotating the crank 127. This conditions the interlock mechanism so that the hose support may be operated to close the motor switch (not shown) upon actuation of switch rod 109 in an upward direction. The nozzle 79 is removed from the hose support 81 and the hose support pulled outwardly.

The outward movement of the hose support will be transmitted through the rod 117 to rotate the bell crank 115 in a clockwise direction (Fig. 1) about its fulcrum, which will raise rod 113, link 119 with the seeker 125 and the motor switch rod 109. Such movement is prevented by the interlock mechanism if the register has not been reset to zero. The upward movement of the switch rod will impart a similar movement to coupling 111 and rod 107 to pivot the link 101 about its fulcrum 103 counterclockwise, which will lower rod 97 and permit the latch 85 to rotate in a clockwise direction (Fig. 1) about the rod 87 bringing the roller 91 into engagement with the top of the hose 77.

The hose is pulled out of the housing or extended, with the weight 41 moving up in the channels 27 and 29, guided by the rod 67 and clips 65. This upward movement is limited by the cross member 9. The hose will rotate the rollers 57 and 75 on their respective spacers 53 and 69 so that a reasonable light pull is all that is required to withdraw the hose. It will be noted that the rollers are shorter than the spacers, which permits the rollers to travel endwise on the spacers to accommodate any weave of the hose on both extension and retraction thereof. It also permits lubrication of the rolls and assists in preventing sticking thereof.

The latching mechanism will permit free extension of the hose at all times because passage of the hose in this direction tends to lift the roll. However, when the latch is free of the lever 97, it will be urged into latching position by its weighted portion 95 to prevent retraction of the hose, a slight retraction serving to jam the roller against the hose to frictionally hold it. This action is aided by the fact that the hose curves upwardly to the left in Figure 1 so that the roller cannot pass "over center" in a clockwise direction and release the grip on the hose. When the hose hook is pushed inwardly (usually after the dispensing operation) it raises rod 97 by means of the linkages previously disclosed, to engage the under side of the latch and disengage the roller 91 from contact with the hose by swinging it counterclockwise. The weight or head 47 will move downward to engage the bumpers 61 and this downward movement will retract the extended portion of the hose. The rollers 57 and 75 will rotate in reverse direction from that of the hose extension stroke.

Rolls 76 are provided on each side of the opening 37 to prevent the hose being scuffed against the housing 39 when the hose is pulled to the side and to prevent binding which might interfere with the easy extension or return of the hose.

When the head has fully returned to its lowermost position, the loop of hose outside of the housing will not be long enough to reach the ground. This condition is shown in Figure 7.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a liquid dispensing apparatus having a frame, a housing around said frame, a flow line, a hose, having a nozzle, connected to the line within said housing and extending out through an opening therein, a nozzle support, means operated by said support for starting and stopping the flow of liquid in said line, the hose within said housing being disposed in a loop having upper and lower bights, a movable weight disposed in said lower bight and means adapted for movement to and from effective position in response to operation of said support for holding said weight against downward movement.

2. In a liquid dispensing apparatus having a frame, a housing around said frame, a flow line, a hose, having a nozzle, connected to the line within said housing and extending out through an opening therein, a nozzle support, means operated by said support for starting and stopping the flow of liquid in said line, the hose within said housing being disposed in a loop having upper and lower bights, guide means on said frame, a movable weight disposed in said lower bight and guided in said guide means, and means adapted for movement to and from frictional contact with the hose for holding said weight against downward movement.

3. In a liquid dispensing apparatus having a frame, a housing around said frame, a flow line, a hose, having a nozzle, connected to the line within said housing and extending out through an opening therein, a nozzle support, means operated by said support for starting and stopping the flow of liquid in said line, the hose within said housing being disposed in a loop having upper and lower bights, a movable weight disposed in said lower bight, means adapted for movement to and from effective position for holding said weight against downward movement, and means responsive to the operation of said support in stopping the flow for moving said holding means out of holding position.

4. In a liquid dispensing apparatus having a frame, a housing around said frame, a flow line, a hose, having a nozzle, connected to the line within said housing and extending out through an opening therein, a nozzle support, means operated by said support for starting and stopping the flow of liquid in said line, the hose within said housing being disposed in a loop having upper and lower bights, a movable weight disposed in said lower bight, means adapted for movement to and from frictional contact with the hose for holding said weight against downward movement, and means responsive to operation of the support to start the flow for moving said holding means into holding position.

5. In a liquid dispensing apparatus having a frame, a housing around said frame, a flow line comprising a hose, having a nozzle, disposed partly within said housing and extending out through an opening therein, a nozzle support, means operated by said support for starting and stopping the flow of liquid in said line, the hose within said housing being disposed in an upwardly open bight, a movable weight disposed in said bight for retracting the hose, means adapted for movement to and from clamping position against the hose for holding said hose against retraction and means operable by the operation of said support to flow stopping position for releasing said clamping means.

6. In a liquid dispensing apparatus having a frame, a housing around said frame, a flow line comprising a hose, having a nozzle, disposed partly within said housing and extending out through an opening therein, a nozzle support, means operated by said support for starting and stopping the flow of liquid in said line, the hose within said housing being disposed in an upwardly open bight, a movable weight disposed in said bight for retracting the hose, means adapted for movement to and from clamping position against the hose for holding said hose against retraction, said clamping means comprising a member pivoted adjacent the hose and extending nearly perpendicular thereto whereby to prevent passage of the hose in one direction, means for yieldably urging said member against said hose and means operable by said support when stopping the flow for moving said member against the action of said yieldable means to release said hose.

7. In a liquid dispensing apparatus having a frame, a housing around the frame, an opening in the housing, a flow line in the housing, a hose, having a nozzle, connected thereto and extending in a loop comprising an upwardly open bight and thence through the opening, a weight disposed in the bight for retracting the hose through the opening, holding means for preventing retraction of the hose by the weight comprising a toggle lever having a hose clamping position, means for moving the lever to clamping position, a nozzle support, means operable by the nozzle support for starting and stopping the flow through said line, and means operable by said support for moving the lever from clamping position when the support is in flow stopping position.

8. In a liquid dispensing apparatus having a frame, a housing around the frame, an opening in the housing, a flow line in the housing, a hose, having a nozzle, connected thereto and extending in a loop comprising an upwardly open bight and thence through the opening, a weight disposed in the bight for retracting the hose through the opening, guide means for a portion of the hose, holding means for preventing retraction of the hose by the weight comprising a lever mounted adjacent the guide means and movable to and from a position in which it clamps the hose against the guide means, means for moving the lever to clamping position, a nozzle support, means operable by the nozzle support for starting and stopping the flow through said line, and means operable by said support for moving the lever from clamping position when the support is in flow stopping position.

WALTER M. HARKS.

References Cited in the file of this patent

UNITED STATES PATENTS

| Number | Name | Date |
|---|---|---|
| 1,228,501 | Twite | June 5, 1917 |
| 1,318,217 | Manthey et al. | Oct. 7, 1919 |
| 1,458,115 | Caldwell | June 5, 1923 |
| 1,487,436 | Brooks | Mar. 18, 1924 |
| 1,493,936 | Hale | May 13, 1924 |
| 2,150,025 | Cook | Mar. 7, 1939 |
| 2,225,271 | Hope | Dec. 17, 1940 |
| 2,242,749 | Hope | May 20, 1941 |
| 2,326,636 | Grise | Aug. 10, 1943 |
| 2,339,308 | Waugh | Jan. 18, 1944 |
| 2,345,338 | Goldberg | Mar. 28, 1944 |
| 2,405,264 | Marvel | Aug. 6, 1946 |